United States Patent [19]
Vanachen et al.

[11] Patent Number: 5,203,904
[45] Date of Patent: Apr. 20, 1993

[54] PROCESS FOR THE PRODUCTION OF BENT GLASS PLATES WITH MORE MARKEDLY BENT AREAS

[75] Inventors: Luc Vanachen, Eupen, Belgium; Hans-Werner Kuster, Aachen, Fed. Rep. of Germany; Hubert Havenith, Wurselen, Fed. Rep. of Germany; Wilfried Korsten, Heinsberg, Fed. Rep. of Germany

[73] Assignee: Saint-Gobain Vitrage International, Courbevoie, France

[21] Appl. No.: 745,713

[22] Filed: Aug. 16, 1991

[30] Foreign Application Priority Data

Aug. 17, 1990 [DE] Fed. Rep. of Germany ........ 4026094

[51] Int. Cl.[5] .......................................... C03B 23/03
[52] U.S. Cl. ........................................ 65/106; 65/107
[58] Field of Search ................ 65/106, 107, 273, 287

[56] References Cited

U.S. PATENT DOCUMENTS

| | | | |
|---|---|---|---|
| 3,333,935 | 8/1967 | Valchar | 65/104 |
| 3,457,060 | 7/1969 | Leflet | 65/274 |
| 3,960,535 | 6/1976 | Hamilton | 65/273 |
| 5,009,691 | 4/1991 | Aratani | 65/106 |

FOREIGN PATENT DOCUMENTS

| | | |
|---|---|---|
| 2284570 | 4/1976 | France . |
| 2315486 | 1/1977 | France . |
| 2359795 | 2/1978 | France . |

OTHER PUBLICATIONS

Tooley, The Handbook of Glass Manufacture, 1984 pp. 178-179.

*Primary Examiner*—Joye L. Woodard
*Attorney, Agent, or Firm*—Oblon, Spivak, McClelland, Maier & Neustadt

[57] ABSTRACT

In the manufacture of bent or curved car glass plates or panes with more markedly bent areas, the latter are additionally locally heated with acetylene—oxygen, or acetylene—air, flames. An apparatus suitable for this includes a continuous furnace (1) and a bending station (3) with a bending mold (41) positioned above the conveying plane of the glass plates (9), as well as a ring mold (45) which serves as a countermold and a conveying ring and which is located on a movable carriage (44). In the areas of more marked bending below the ring mold (45) are provided burner tubes (42), which are supplied via flexible hoses with the acetylene gas and the combustion air or oxygen. Alternatively, the plates are locally heated in a transition zone (7) located between the furnace and the bending station by a gas burner (8), and thereafter pressed in the bending station by an upper bending mold (14) and a lower ring mold (16).

6 Claims, 4 Drawing Sheets

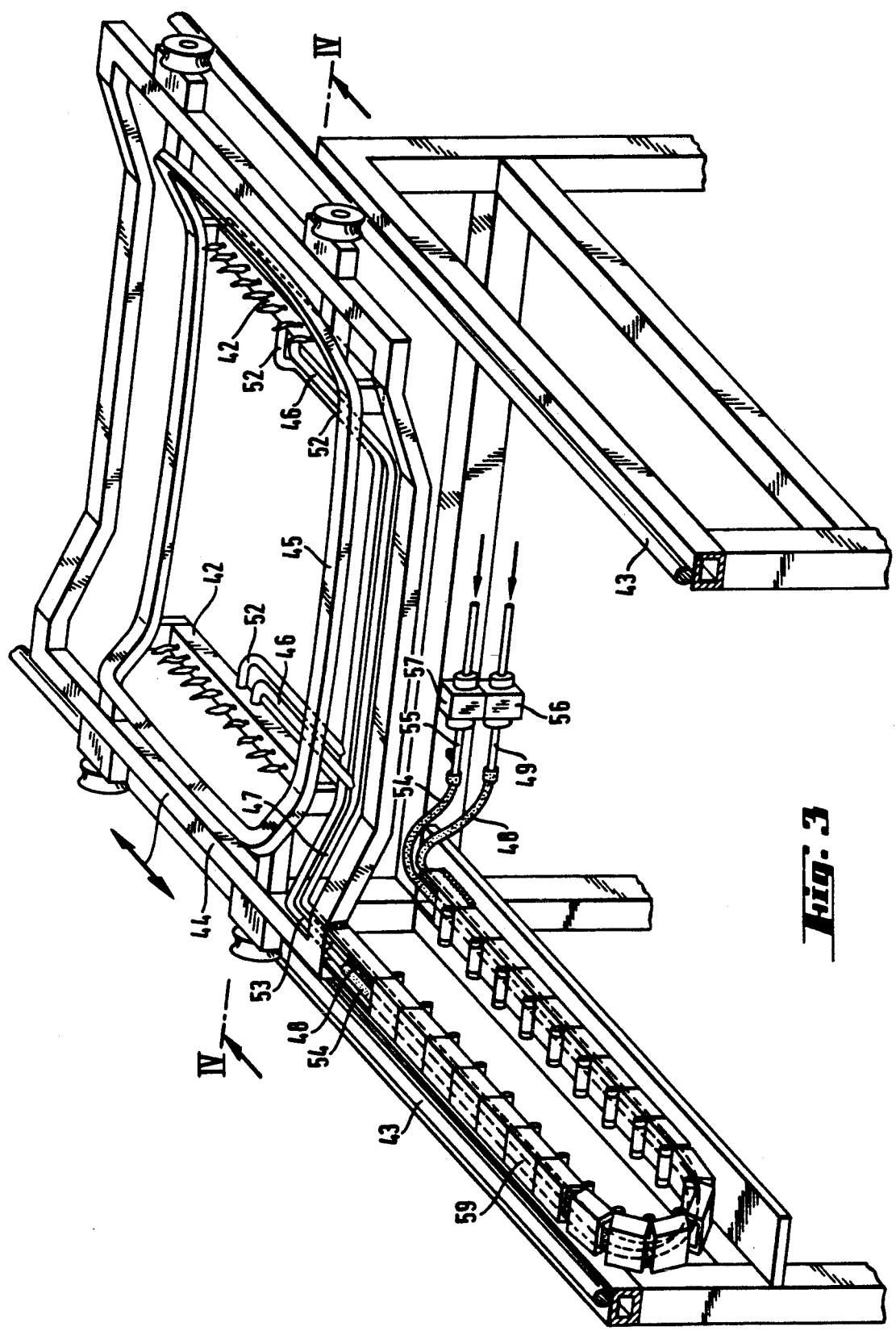

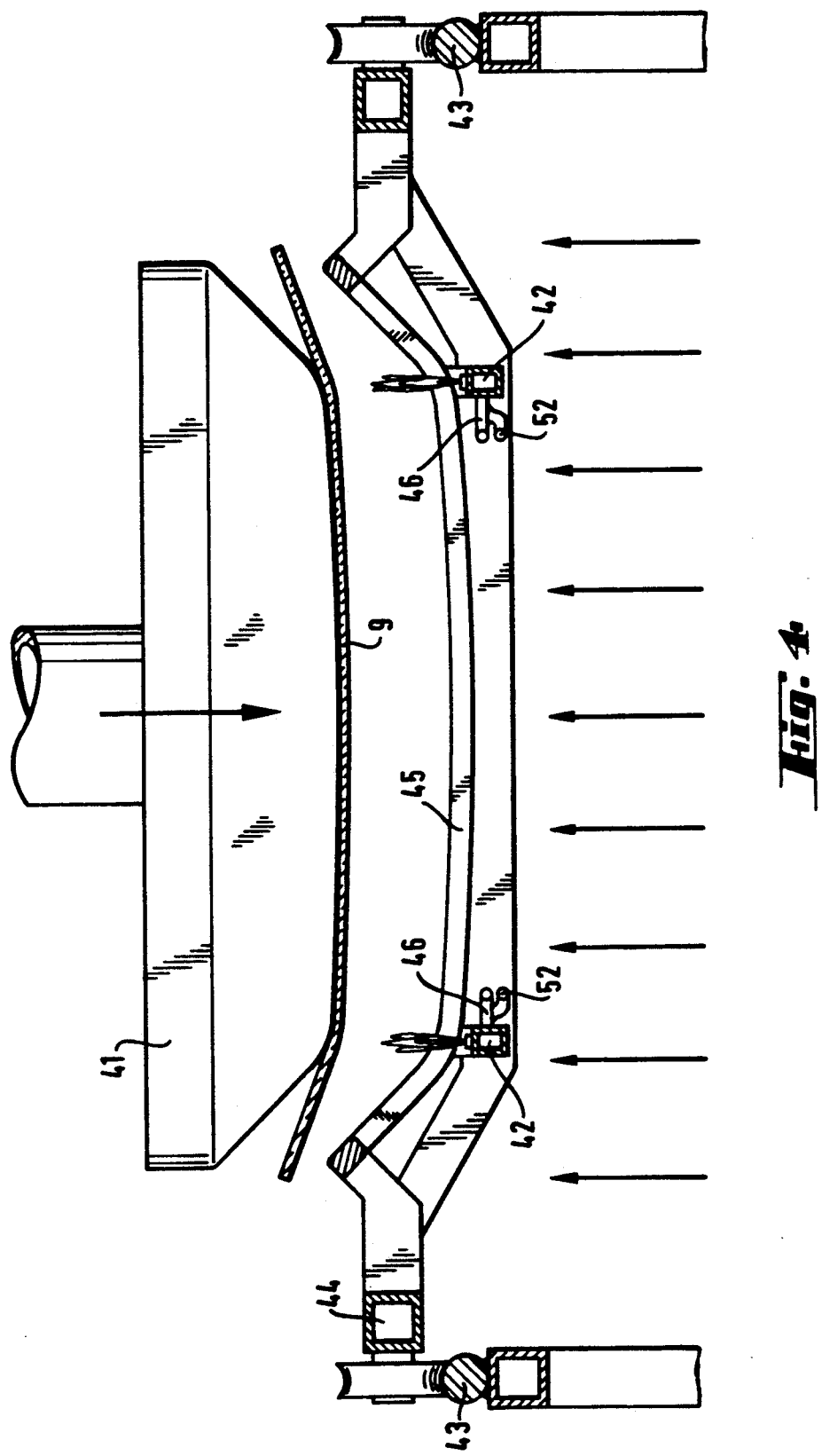

PROCESS FOR THE PRODUCTION OF BENT GLASS PLATES WITH MORE MARKEDLY BENT AREAS

BACKGROUND OF THE INVENTION

1. Field of the Invention

The invention relates to a process for the production of bent or curved glass plates or panes with more markedly bent areas, and in particular bent automotive glass plates in which the glass plates are homogeneously heated in a continuous furnace to the bending temperature, are locally additionally heated with gas flames in the more markedly bent areas on leaving the continuous furnace and are subsequently bent.

2. Description of the Related Art

In a known process of this type there are provided in the last portion of the continuous furnace and above the glass plate conveying place movable gas burners whose movement is controllable independently of the movement of the glass plates and which follow the latter within the continuous furnace with the aid of a suitable movement means (EP 0 103 983). The glass plates are bent on a bending ring in the following bending station.

Following the additional local heating by gas burners in the known process during the travel of the glass plates up to the bending apparatus, there is a more or less pronounced temperature gradient in the glass plate surface. In order to ensure the desired local temperature increase at the time of the bending process, it is necessary to have a relatively strong additional heating. However, such a strong additional heating can lead to undesired deformations of the glass plates, which impair their optical characteristics.

In a process of the aforementioned type, it is also known to arrange stationary gas burners within the bending station (DE-25 40 603, DE-26 28 518). However, it is not possible to achieve an adequate local temperature rise solely with the aid of the devices described therein and the fuel gases used, because the short cycle times of the device required for economic reasons are not sufficient for the necessary temperature rise.

SUMMARY OF THE INVENTION

An object of the present invention is to provide a process of the aforementioned type, in which the desired local temperature rise is achieved with minimum influence of the neighboring areas of the glass plate and in a minimum period of time.

According to the invention this problem is solved in that the glass plates are locally subject to the action of acetylene—air, or acetylene—oxygen, flames to bring about the additional local heating.

The inventive use of acetylene as the fuel gas for the additional local heating of the glass plates makes it possible, compared with conventionally used fuel gases, to obtain much higher flame temperatures and therefore a much greater local heating of the glass plates in a shorter time. Acetylene—oxygen flames have the highest flame temperature (3160° C.) of all hydrocarbons, being at least 400° C. higher than the fuel gases conventionally used for this purpose such as methane, propane or natural gas. It has surprisingly been found that glass plates can be directly exposed to such hot flames without undergoing surface deformations or other defects, if at the time of the glass flame action the glass plates have uniformly reached their bending temperature of at least approximately 620° C.

Due to the high flame temperature which can be reached, a relatively short flame action period is sufficient. In particular the exposure of the glass plate to the gas flames can take place in the relatively short transition zone between the continuous furnace and the bending station, without the gas burners having to follow the glass plates in their conveying path direction. This considerably simplifies the equipment necessary for the additional heating. It is also possible to carry out the local additional heating of the glass plates within the actual bending station.

When the gas burners are positioned in the transition zone between the continuous furnace and the bending station, or within the actual bending station, it is possible in a relatively simple manner to ensure that the acetylene-gas carrying lines are kept at temperatures below approximately 200° C., which is not possible when the burners are located within the continuous furnace. However, the limitation of the gas line temperature is necessary because high temperatures can decompose the acetylene gas, which can have various disadvantageous consequences. For example, solid carbon particles resulting from the decomposition of the gas can clog the burner nozzles. However, in the transition zone between the continuous furnace and the bending station the temperatures are normally relatively low compared with the temperatures within the continuous furnace. If the gas flames are to be used within the bending station, the equipment must be designed in such a way that the gas burners are only introduced for a short time into the hot bending station, while otherwise being in the cold area surrounding it, so that there is no excessive heating of the gas lines.

According to an advantageous further development of the invention the glass plates are exposed to the action of the gas flames on the surface which is to be plastically expanded or extended during the bending process. As is conventional, the glass plates are so bent in the bending station that the convex surface is located on the underside; consequently the glass plates are exposed to the gas flame action on the lower surface. The plastic expansion of the glass surface is known to be more critical than is plastic compression and consequently requires a somewhat higher temperature. If the gas flames are directed onto this more critically stressed surface, it is possible to reduce the total heat quantity applied without suffering any disadvantages. This simultaneously leads to the important advantage that on the concave side with which the glass plate is conventionally in contact with a full-surface bending mold, there is a reduction in the risk of damage to the glass surface by contact with the bending tool as a result of the lower surface temperature.

If the lower surface of the glass plates is exposed to the action of the gas flames, a further advantage is obtained in that with glass plates which are to be provided with a printed-on baking varnish which, due to the conveying of the glass plates in the continuous furnace on conveying rollers, is always located on the top side of the glass plates, the gas flames and the fuel gases do not come into contact with the baking varnish. This reliably avoids changes or modifications to the baking varnish, which can occur under the influence of flames and/or fuel gases.

The invention also relates to an apparatus for performing the process with additional local heating of the glass plates within the bending station, with a full-surface, convex bending mold arranged above the conveying plane of the glass plates in the bending station and a concave ring mold located on a movable carriage and which serves as a conveying ring for transferring the bent glass plates from the bending station to the following cooling station and optionally also as a countermold during the bending process.

According to the invention the locally acting gas burners are located on the carriage carrying the concave ring mold below the latter and connected by means of flexible hoses to acetylene feed lines below the bending station.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows a larger-scale view of the carriage according to FIG. 2 carrying the ring mold with the gas burner positioned below the latter; and FIG. 4 shows the bending press of FIG. 2 comprising the upper bending mold and the ring mold located on the movable carriage in its working position shortly prior to the pressing process.

DETAILED DESCRIPTION OF THE PREFERRED EMBODIMENT

Figure 1:
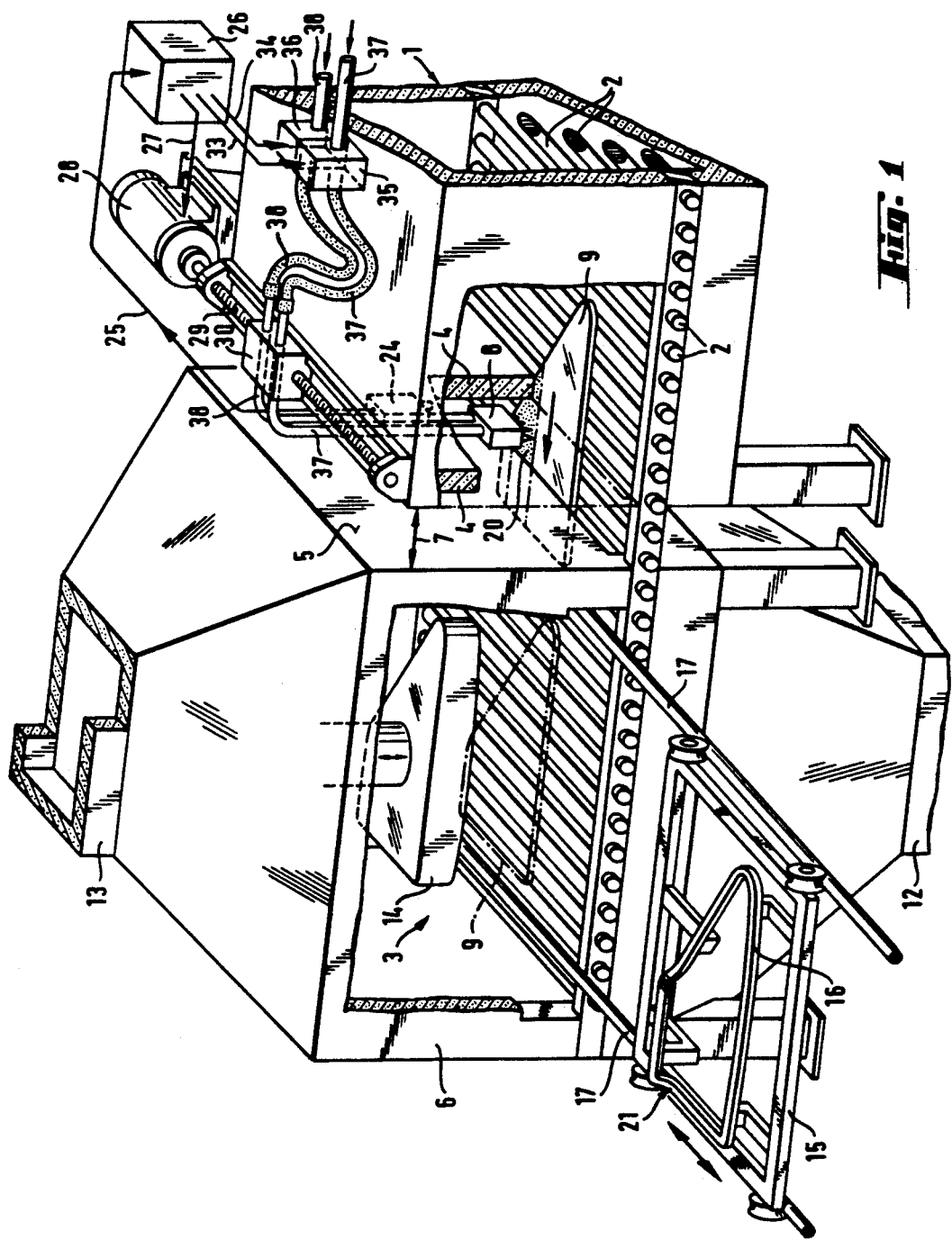
FIG. 1 shows a bending apparatus for glass plates with an additional gas burner between the continuous furnace and the bending station.

The bending apparatus shown in FIG. 1 comprises a continuous furnace 1 with driven conveying shafts 2 and a bending station 3 connected to said furnace 1. Between the rear end wall 4 of the continuous furnace 1 and the wall 5 of the casing 6 surrounding the bending station 3 opposite to said end wall 4 is provided a gap 7 in which is located the gas burner 8 for the additional local heating of the glass plates 9.

A hot gas flow can be introduced into the casing 6 surrounding the bending station 3 from below through the duct 12 and which flows out of the top of the casing 6 through the duct 13 for recycling. As a result of this hot gas flow, as soon as the glass plate 9 has reached its end position below the bending mold 14 within the bending station 3, it is raised from the conveying shafts 2 (e.g., by the gas flow from duct 12) and pressed against the full-surface bending mold 14. The carriage 15 with the ring mold 16 then moves on the rails 17 into the bending station 3, so that the ring mold 16 is located below the bending mold 14. The bending mold 14 with the glass plate is then lowered onto the ring mold 16 and pressed against the latter, so that the glass plate is given its final shape. The gas flow is not stopped or reduced and the bending mold 14 is returned to its upper position. The carriage 15 with the bent glass plate located on the ring mold 16 are now moved out of the bending station 3 and moved into a following (not shown) cooling station in which the glass plate is tempered, e.g., by abrupt cooling.

When the glass plate 9 leaves the continuous furnace 1, it has uniformly assumed a temperature which is adequate for uniform bending with a relatively large bending radius. However, here the glass plate 9 is to undergo more pronounced bending in a strip-like area 20, and so the ring mold 16 together with the bending mold 14 have a correspondingly more markedly curved portion 21. In the strip-like area 20 the glass plate 9 is additionally locally heated with the aid of the gas burner 8, the latter being positioned in stationary manner in the gap 7 between the continuous furnace 1 and the bending station casing 6 and the strip-like area 20 of the glass plate 9 is exposed to the action of gas flames on the path from the continuous furnace to the bending station.

As a function of the position and travel direction of the strip-like area 20, the position of the gas burner 8 can be adjusted at right angles to the glass plate movement direction and optionally can be moved during the action of the gas flames on the glass plate. For this purpose the position of the glass plate 9 is, e.g., monitored with the aid of a video camera 24. The data supplied by the latter are passed via the line 25 to a processor 26 by which, in accordance with a predetermined program and via the line 27, the motor 28 is controlled. The motor 28 drives the threaded spindle 29, as a result of which the slide 30, threaded to the spindle, is correspondingly moved. Thus, if necessary, strip-like areas of the glass plate 9 can be additionally heated, which strip-like areas run in a sloping manner with respect to the glass plate conveying direction.

The gas flames produced by the gas burner 8 can optionally burn uninterruptedly. However, it is also possible to only ignite the gas flames when a glass plate is below the gas burner 8. In this case the gas burner 8 is once again controlled by the video camera 24 and the processor 26 which, by means of the lines 33 and 34, control the valves 35 and 36. The valve 35 opens or closes the acetylene gas-carrying line 37, while the valve 36 opens or closes the line 38 supplying the oxygen or compressed air to the burner 8. Optionally the valves 35 and 36 can be time controlled so that on switching the burner on and off adequate oxygen is always supplied to avoid acetylene flame soot formation.

As a result of a corresponding thermal insulation of the continuous furnace 1 and the bending casing station 6, it is ensured that the temperature in the gap 7 remains relatively low. Optionally, the latter can be cooled by additional air cooling. Therefore neither the acetylene gas feed line 37 nor the burner 8 reach inadmissibly high temperatures, which could lead to decomposition of the acetylene gas.

Another embodiment of the inventive process will be described relative to FIGS. 2 to 4. In this case the additional local heating of the glass plate takes place in the bending station at the lower side of said plate.

Figure 2:
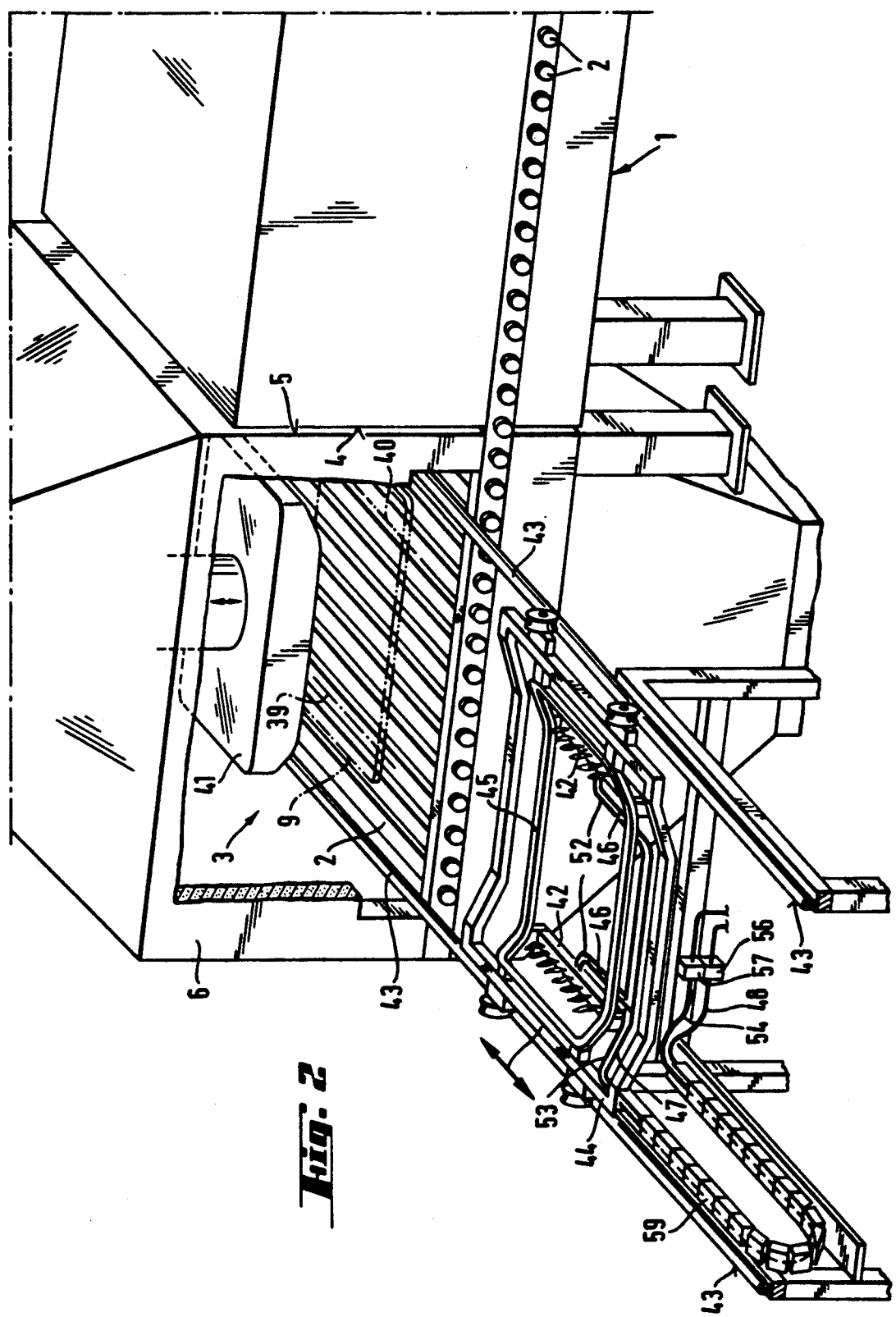
FIG. 2 shows another bending apparatus for glass plates with additional gas burners for local heating of the glass plates within the bending chamber.

The apparatus shown in FIG. 2 also has a continuous roller furnace 1 and a bending station 3 surrounded by a casing 6 and which are in this case directly connected to one another without any gap. The bending process takes place in fundamentally the same manner as described relative to FIG. 1.

In the case shown here, along two lines 39 and 40 at right angles to the glass plate conveying direction, the glass plate 9 is to be provided with marked bends, i.e., areas with a small bending radius, so that additional local heating takes place along these areas.

The additional local heating takes place within the bending station 3 with the aid of two burner tubes 42 which are mounted on the carriage 44 movable on rails 43 below the frame bending mold 45. On their top surface the burner tubes 42 have a row of burner openings, so that in each case a row of successive gas flames acts on the underside of the glass plate. The acetylene gas is supplied to the burner tubes 42 by means of tubes 46, 47, the flexible hose 48 and the line 49 (FIG. 3), while the oxygen or compressed air is supplied to the burner tube 42 by means of tubes 52, 53, the flexible hose 54 and the line 55. Via the valves 56 and 57, the gas burners are switched on or the volume flows of acetylene and oxygen or compressed air are regulated.

The carriage 44 carrying the frame bending mold 45 and the burner tubes 42 is located for most of the time outside the bending station in an ambient temperature zone and is only briefly introduced into the bending station and exposed to the hot gas flow, i.e., when it carries out the bending process and brings the bent glass plate out of the bending station. During this short residence time within the bending station, the tubes carrying the acetylene gas and the burner tubes are only subject to limited heating, so that the admissible temperatures for acetylene gas are not exceeded. Optionally the tubes can be provided with a suitable thermal insulation.

The flexible hoses 48 and 54 are guided in a suitable armored chain 59, which ensures that they are not damaged mechanically during the movement of the carriage 44.

As can be seen from FIG. 4 the upwardly flowing hot gas flow raises the glass plate 38 against the full-surface bending mold 41. As soon as the glass plate 38 is in this position, the carriage 44 with the frame bending mold 45 is moved under the bending mold 41. In this position of the carriage 44 the gas flames produced by the burner tubes 42 act on the lower surface of the glass plate 38 along the linear areas which are to undergo more pronounced bending. The time interval necessary for the normal bending cycle is sufficient to increase the glass plate temperature in the desired areas by the amount necessary for completely satisfactory bending.

After carrying out the press-bending process by lowering the bending mold 41 and pressing against the frame bending mold 45, the bending mold 41 is raised into its upper starting position and the carriage 44 with the bent glass plate is moved out of the bending station 3 into a (not shown) cooling station in which the bent glass plate is tempered, e.g., by blowing cooling air onto it.

Obviously, numerous variations and modifications of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Process for the production of bent glass plates with areas of more pronounced bending, comprising the steps of:
    homogeneously heating the glass plates in a continuous furnace to the bending temperature;
    locally additionally heating the glass plates after leaving the continuous furnace by applying gas flames produced by acetylene fuel in the areas intended to have more pronounced bending; and
    bending the locally additionally heated glass plates in a bending station, wherein the additional heating step is performed in a transition zone between the continuous furnace and the bending station.

2. Process according to claim 1, including acetylene gas carrying lines, wherein the acetylene gas-carrying lines are kept at temperatures below 200° C.

3. Process according to claim 1, wherein the gas flames are applied on that surface of the glass plates which is to be expanded during the bending step.

4. Process for the production of bent glass plates with areas of more pronounced bending, comprising the steps of:
    homogeneously heating the glass plates in a continuous furnace to the bending temperature;
    immediately transferring the glass sheets to a heated bending station;
    introducing acetylene fuel burners into said heated bending station;
    locally additionally heating areas of the bending plates which are intended to have more pronounced bending by applying gas flames produced by the burner in the bending station;
    removing the burners from the bending station; and
    bending the locally additionally heated glass plates.

5. Process according to claim 4, including acetylene gas carrying liens, wherein the acetylene gas-carrying liens are kept at temperatures below 200° C.

6. Process according to claim 4 wherein the gas flames are applied on that surface of the glass plates which is to be expanded during the bending step.

* * * * *